May 7, 1957  L. G. BOUGHNER  2,791,130
MULTI-SPEED DRIVE AXLE
Filed March 9, 1954  5 Sheets-Sheet 2
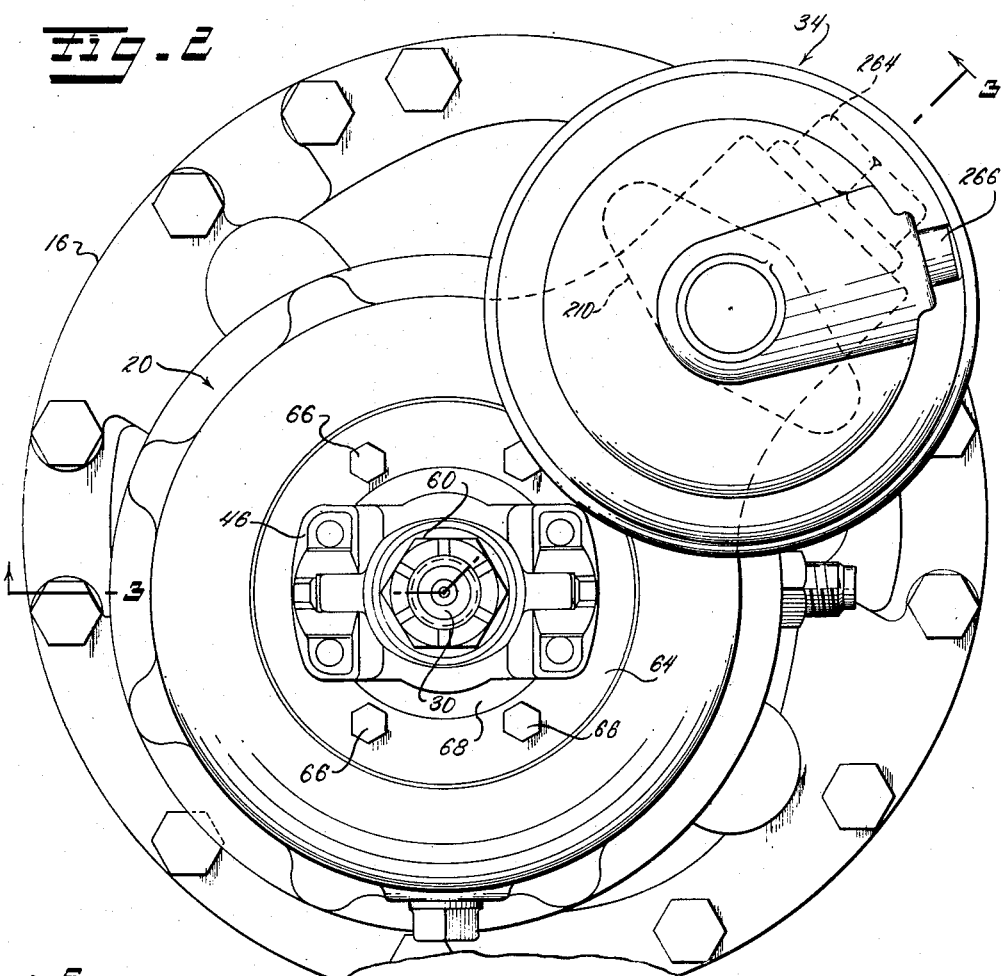
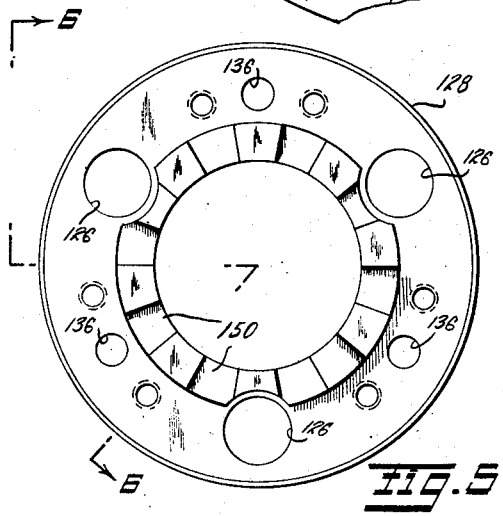
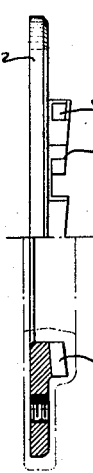
INVENTOR.
LAWRENCE G. BOUGHNER
BY Strauch, Nolan & Diggins
ATTORNEYS May 7, 1957 L. G. BOUGHNER 2,791,130
MULTI-SPEED DRIVE AXLE
Filed March 9, 1954 5 Sheets-Sheet 3
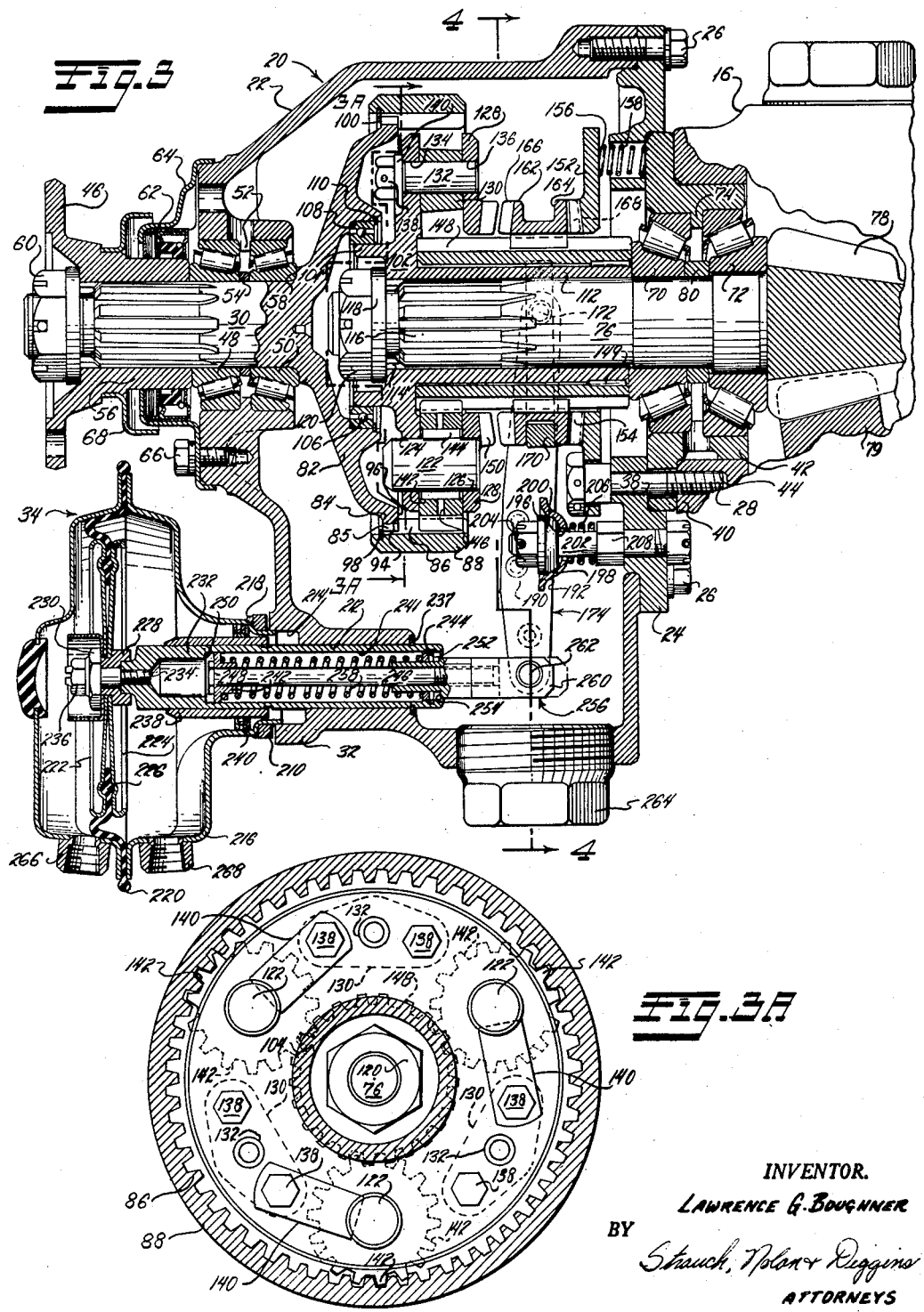
INVENTOR.
LAWRENCE G. BOUGHNER
BY
ATTORNEYS

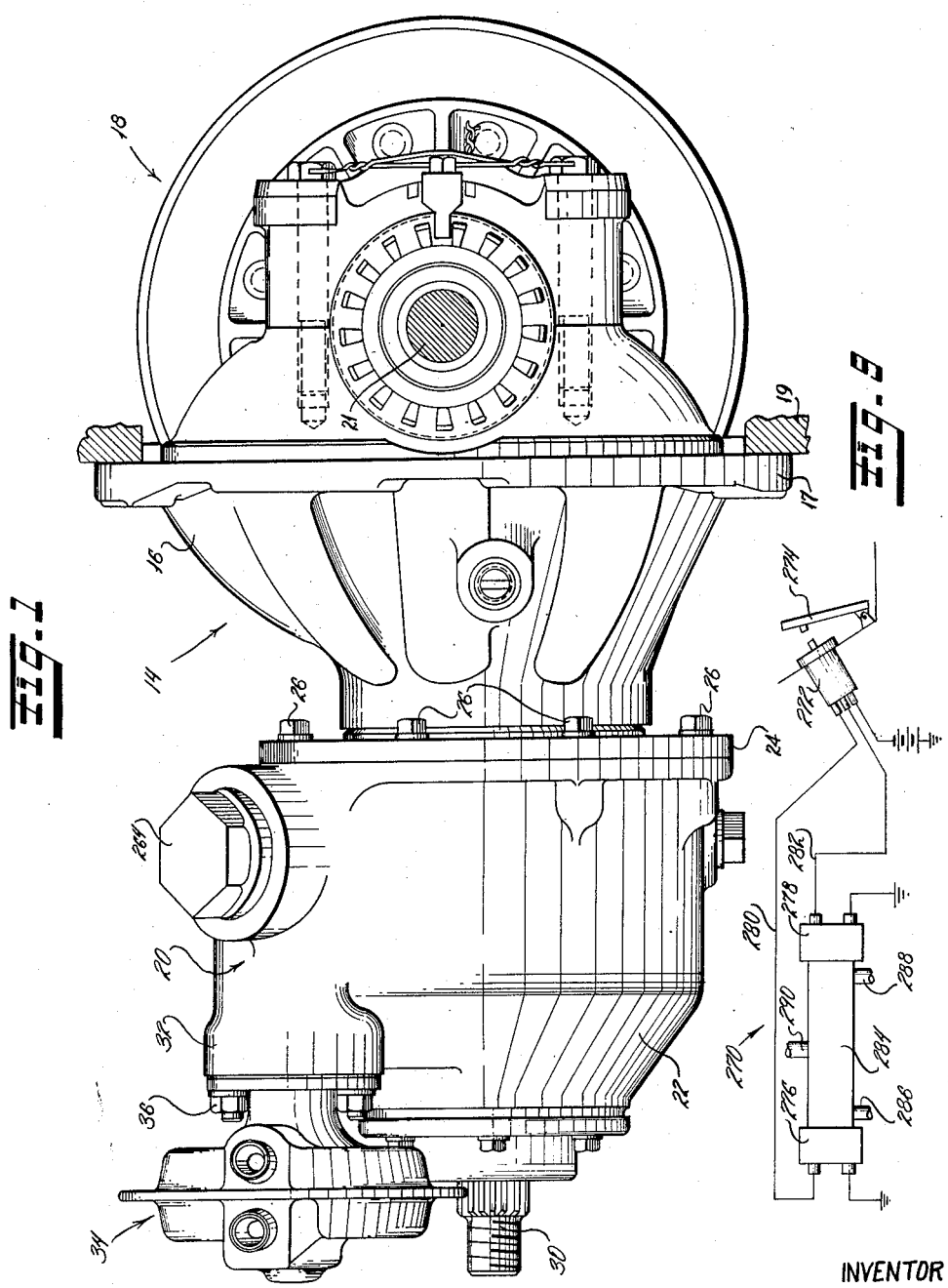

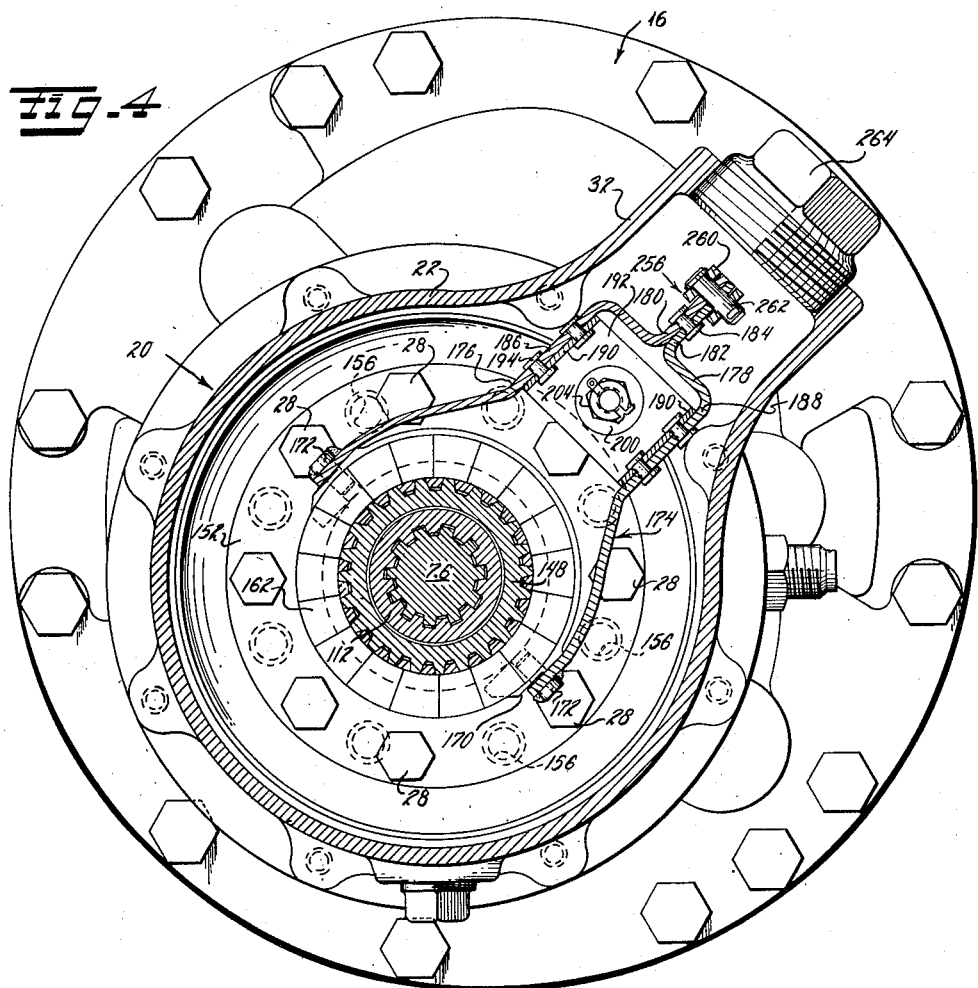

May 7, 1957  L. G. BOUGHNER  2,791,130
MULTI-SPEED DRIVE AXLE
Filed March 9, 1954  5 Sheets-Sheet 5
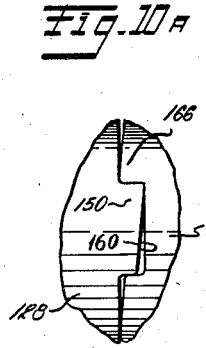
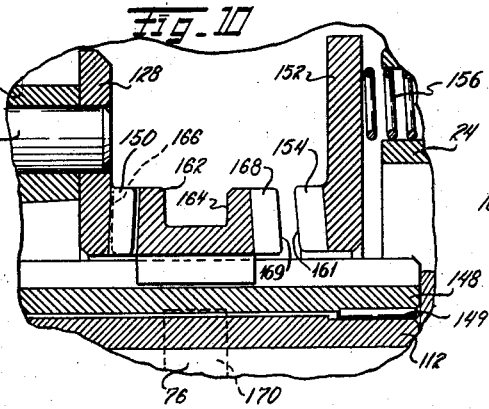
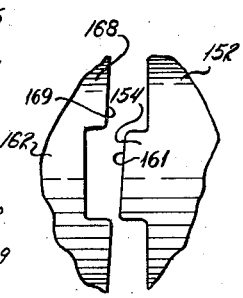
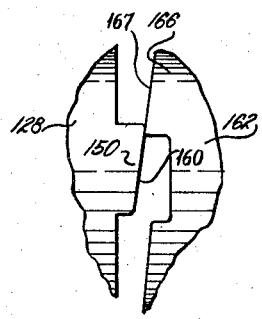
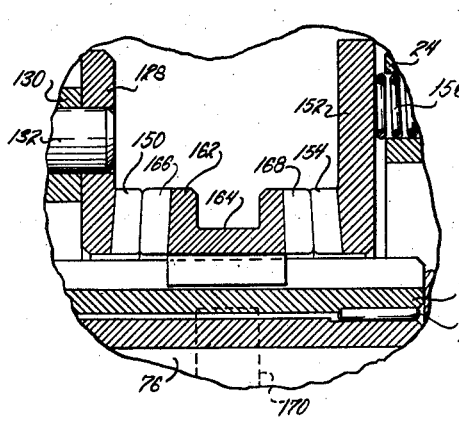
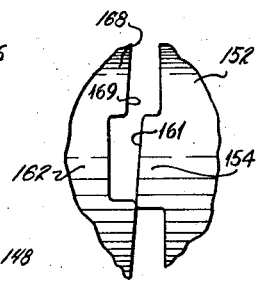
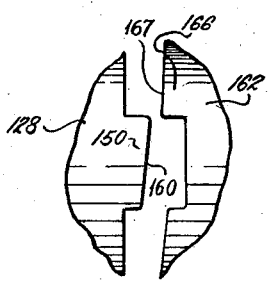
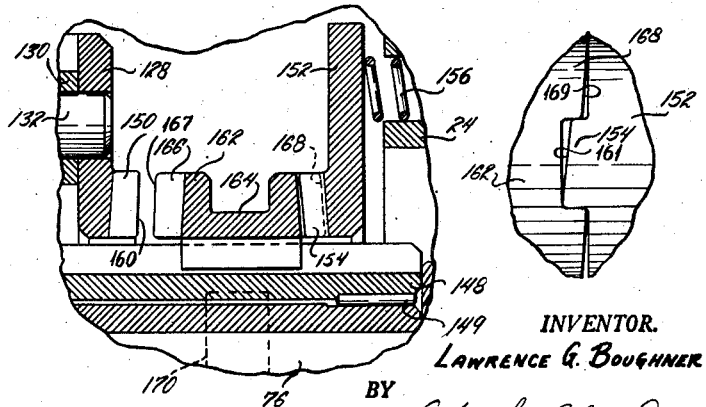
INVENTOR.
LAWRENCE G. BOUGHNER
BY
Strauch, Nolan & Riggins
ATTORNEYS United States Patent Office 2,791,130
Patented May 7, 1957

2,791,130

MULTI-SPEED DRIVE AXLE

Lawrence G. Boughner, Detroit, Mich., assignor to Rockwell Spring and Axle Company, Coraopolis, Pa., a corporation of Pennsylvania Application March 9, 1954, Serial No. 414,955

6 Claims. (Cl. 74—695)

The present invention relates to improvements in multi-speed drive mechanism and in certain aspects more particularly to improvements in multi-speed drive mechanism of the type in which the selective multi-speed gearing is mounted upon the nose of the differential carrier of an axle. This type will be referred to hereinafter as a multi-speed front mounted drive axle. The invention will be described in its preferred embodiment in a planetary two speed gear box adapted to be mounted upon the nose of the differential carrier of a standard and single speed axle.

In recent years there have been constant efforts to provide a practical low cost multi-speed planetary gear box arrangement which can be readily mounted upon the nose of the carrier of a single speed carrier mounted differential drive mechanism to convert such a single speed drive mechanism from a single speed to a multi-speed drive.

One of the most serious problems involved is the elimination of excessive wear upon the planetary gearing resulting from eccentricity between the differential drive pinion and the input shaft of the planetary gearing. This problem arises from the fact that, since the differential drive pinion must be aligned accurately on the carrier to properly mesh with differential ring gear, the planetary gearing of prior art devices had to be also fixed to the carrier in accurate alignment with the differential drive pinion if excessive gear wear was to be avoided.

To overcome the foregoing difficulties, it is therefore a primary object of the present invention to provide, especially for a multi-speed front mounted planetary drive axle, a multi-speed gear mechanism and mounting therefor of such improved construction that such mechanism can be cooperatively mounted relative to the differential drive pinion of such an axle drive mechanism with a practical degree of accuracy without causing excessive gear wear.

More specifically it is an object of the present invention to provide in a multi-speed front mounted planetary drive axle, a multi-speed planetary gear mechanism interconnecting axially aligned rigidly supported, relatively rotatable input and output members in which the meshed gear members are mounted for limited relative lateral floating movement to seek their proper center of rotation and thereby produce even wear distribution.

In the design of multi-speed planetary gear drive axles there have been constant efforts to improve the clutch mechanisms therein utilized to effect the speed selection. These efforts have been directed toward improvements in the smoothness of shift between speeds and toward the reduction of overall costs of the unit. As a further improvement in such mechanisms, to effect cost reduction without sacrifice of efficiency of operation, it is a further important object of this invention to provide an improved multi-speed planetary gear mechanism embodying a clutch mechanism having spaced opposed toothed rings mounted on opposite sides of a toothed collar axially displaceable into engagement with either to effect the desired speed selection and of such improved construction that the two toothed rings may be machined from identical forgings.

An ancillary object of the present invention is to provide in a two speed planetary gear mechanism, an improved clutch mechanism and mounting therefor for effecting the alternate selection of the speeds of operation of such a mechanism whereby in a clutch mechanism utilizing inclined end face toothed elements the shift of the movable clutch element between its alternate positions of engagement can be effected rapidly and smoothly.

A further object of the invention is to provide in a clutching mechanism a toothed collar having ratchet teeth on opposite sides shifted between mesh with ratchet toothed rings a novel axially resilient mount for one of said rings.

These and other objects of the present invention will become more fully apparent by reference to the appended claims and as the following detailed description proceeds in reference to the accompanying drawings wherein:

Figure 1 is a side elevational view of a front mounted two speed planetary gear drive axle embodying the principles of the present invention;

Figure 2 is a front end view of the assembly of Figure 1;

Figure 3 is a sectional view taken substantially along line 3—3 of Figure 2;

Figure 3A is a sectional view taken substantially along line 3A—3A of Figure 3;

Figure 4 is a transverse sectional view taken substantially along line 4—4 of Figure 3;

Figure 5 is an end view in elevation of a planetary pinion carrier mounted toothed ring for use in the assembly of Figure 1;

Figure 6 is a view of the toothed ring of Figure 5 partially in section taken along the line 6—6 of Figure 5;

Figure 7 is an end view of a gear box mounted toothed ring of the assembly of Figure 1;

Figure 8 is a side view of the toothed ring of Figure 7 partially in section taken along the line 8—8 of Figure 7;

Figure 9 is a schematic diagram showing the control system for the speed selection of the planetary gear drive;

Figures 10, 10A and 10B are respectively a fragmentary sectional view and fragmentary elevational views of portions of the clutch mechanism in the configuration assumed by the parts of that mechanism to establish a direct drive;

Figures 11, 11A, and 11B are, respectively, a fragmentary sectional view and fragmentary elevational views of the same elements as illustrated in Figures 10, 10A and 10B respectively but showing the components in an intermediate or transition position assumed by these parts during the shift from direct to underdrive; and Figures 12, 12A and 12B are, respectively, a fragmentary sectional view and fragmentary elevational views of the same components illustrated in Figures 10, 10A and 10B, respectively, but showing the configuration of these parts establishing the underdrive condition of the planetary gear mechanism.

Referring now to the drawings, and particularly to Figure 1, 14 generally indicates a multiple speed differential drive axle assembly comprising a differential carrier 16 on which is journalled a conventional bevel gear differential mechanism 18. Carrier 16 has a front housing portion on which is mounted a two speed planetary transmission 20 permitting selective drive of the differential mechanism at one of two alternative speed ratios relative to the drive torque supplying engine driven propeller shaft (not shown) by which the transmission is driven. The housing portion of carrier 16 is adapted to be secured over a front opening in the usual axle housing 19 as by bolts passing through flange 17. The usual axle shaft is indicated at 21. The housing 22 of transmission 20 is provided with a detachable rear end wall 24 fixed thereto by circumferentially disposed bolts 26 and, as is shown in Figure 3, to carrier 16 by bolts 28. The forward portion of the housing 22 of planetary transmission 20 slightly above and to one side of transmission input shaft 30 is provided with a mounting boss 32 on which is mounted a clutch actuating fluid motor 34 by bolts 36 for effecting the speed ratio selection.

As shown in Figure 3, the end wall 24 of the transmission housing 22 is fixed to the nose of differential carrier 16 by a plurality of shoulder bolts 28 which pass through suitably aligned openings 38 in wall 24 and the peripheral flange 40 of a bearing cage 42 to engage suitable threaded openings 44 in the end face of the nose of differential carrier 16.

Flange coupling 46, splined upon the forward end of input shaft 30, operatively connects the input shaft 30 to a conventional engine driven propeller shaft (not shown). Shaft 30 is rotatably supported in the housing 22 by a pair of opposed tapered roller bearings 48 and 50 disposed on opposite sides of and in abutting relation at their outer races with an integral internal shoulder 52 of housing 22. The inner races of thrust bearings 48 and 50, which are separated by intermediately disposed annular spacer 54, are clamped on shaft 30 between the adjacent end face of the hub 56 of coupling 46 and a shoulder 58 integral with input shaft 30 by a nut 60. Bearings 48 and 50 are so mounted in opposed relation that the cone angles of the bearing rollers are oppositely disposed with respect to the shaft 30. This opposed mounting of bearings 48 and 50 maintains shaft 30 fixed axially in the housing 22 against light forward and reverse axial thrust loads imparted to shaft 30 by the pulsations of the propeller shaft universal joints.

Seal 62 is mounted in sealing relation about the hub 56 of coupling 46 by a sheet metal seal retainer 64, which is secured to the exterior of housing 22 by peripherally disposed bolts 66. Dish-shaped baffle 68 is press fitted on coupling 46 with its concave surface in adjacent overlying relation to the exposed end of seal 62 for rotation with coupling 46 to protect the seal 62 from foreign matter.

Spaced tapered roller bearings 70 and 72, the outer races of which are received in bearing cage 42 on opposite sides of and in abutting contact with an intermediate internal shoulder 74 integral with the bearing cage 42, rotatably support in axially spaced fixed alignment with respect to shaft 30 the integral shaft 76 of a hypoid differential drive pinion 78 constantly meshed with ring gear 79 of the differential 18. The inner races of bearings 70 and 72 are held in axially spaced relation by intermediately disposed annular spacer 80. Bearings 70 and 72 are mounted in opposed relation in the same manner as thrust bearings 48 and 50, which dispoition of the bearings holds the pinion shaft 76 in the proper axial position with respect to shaft 30 under all forward or reverse axial and radial loads.

At the right hand end of input shaft 30, as viewed in Figure 3, shaft 30 is formed with an enlarged dish shaped peripheral flange portion 82 having a splined periphery 84 the splines 85 of which engage the internal teeth 86 of ring gear 88 to non-rotatably secure gear 88 thereto. Teeth 86 of ring gear 88 are cut away to interfit with splines 85 and provide on each tooth a flat radially extending shoulder 94, all lying in a common plane and each abutting a radially extending face 96 of flange 82. Snap ring 98 mounted in an internal groove of ring gear 88 abuts a flat face 100 on the adjacent end faces of splines 85 to axially restrain ring gear 88 in assembled position on flange 82. There is a sufficient clearance between the splines 85 and teeth 86 for permitting a slight radial play between gear 88 and flange 82.

Planetary gear carrier 102 is provided with integral hub 104 coaxially piloted by a bearing 106 in bore 108 of flange 82 and axially restrained therein by snap ring 110. Carrier 102 is provided at its opposite end with an integral elongated hub 112 internally splined at 114 to drivingly engage external splines 116 at the left hand end of the shaft 76. Carrier 102 is axially fixed on the shaft 76 between washer 118 and the inner race of bearing 70 by a nut 120 threaded on the extreme end of the shaft 76. Spindles 122 are each press fitted at one end into one of a plurality of equiangularly spaced bores 124 in carrier 102 and at their opposite ends in aligned bores 126 of an axially spaced clutch ring 128. Carrier 102 and clutch ring 128 are held in rigid axially spaced relation by a spacer 130 interposed between the adjacent faces thereof between each adjacent pair of the spindles 122. Spacers 130 are each held in position by a pin 132 press fitted in suitably aligned bores 134 and 136 in carrier 102 and clutch ring 128 and by machine screws 138 extending through aligned apertures of carrier 102 and spacer 130 and threadedly engaged with ring 128 at each side of the associated pin 132. Rotation of spindles 122 is prevented by locking plates 140 mounted by screws 138 on the left hand face of carrier 102 in engagement with milled grooves in the spindles 122.

A planetary pinion 142 is journalled on each spindle 122 by needle bearings 144 and are each in constant mesh with the teeth 86 of ring gear 88. Planetary pinions 142 are each provided with radially extending apertures 146 to permit the admission of lubricating oil to needle bearings 144.

A sun gear 148 which is in constant mesh with each of the planetary pinions 142 is coextensive in length with and is rotatably mounted on carrier hub 112 by a plurality of needle bearings 149 interposed between sun gear 148 and carrier hub extension 112. The single row of needle bearings 149 in effect result in a cantilever mounting of the sun gear and permits the sun gear to have limited radial floating movements relative to hub extension 112 to seek its own center of rotation and thereby impose uniform loading on all of the planetary pinions 142.

Clutch ring 128 (see also Figures 5 and 6) is provided at its inner end with a series of circumferentially disposed axially directed clutch teeth 150 on one face, extending to the right as viewed in Figure 3. A similar toothed ring 152 (see also Figures 7 and 8) is slidably mounted in housing 22 of transmission 20 on the shoulders of bolts 28 between the heads of bolts 28 and the rear wall 24 of housing. Its axially directed teeth 154, which are similar to teeth 150, are in axially opposed relation to the teeth of clutch ring 128. Brake ring 152 is slidably mounted on the shoulders of screws 28 and is biased into abutment with the heads of screws 28 by a plurality of coiled compression springs 156 disposed in axially guided relation in through bores 158 of rear wall 24 and in abutting contact with the back face of ring 152 and the adjacent face of flange 40 of bearing cage 42. Springs 156 are located on the circular centerline through the axes of screws 28 and are disposed intermediate each adjacent pair thereof as is best shown in Figure 4.

Teeth 150 of clutch ring 128 and teeth 154 of brake ring 152 are provided with individually inclined end faces 160 and 161 respectively each lying in a plane disposed at slight angle from the normal to the axis of rotation of the shaft 76. The illustrated clutch teeth are of the general type known as Maybach teeth fully described in United States Letters Patents 2,049,126 and 2,049,127 to which reference is made for further detail.

Referring to Figures 5 to 8, toothed rings 128 and 152 are made from identical forgings and have identical axially directed teeth, simple machining operations for mounting purposes being all that is necessary to adapt the forgings to either a carrier type clutch ring such as 128 or as a circumferentially stationary brake ring such as 152. The shape of the forgings from which rings 128 and 152 are formed is shown in phantom lines in Figures 6 and 8. The use of identical forgings in manufacturing the two rings 128 and 152 thus materially reduces the cost of manufacture of the planetary transmission.

Referring to Figure 3, a clutch collar 162, internally splined for relative axial sliding driving engagement with the teeth of sun gear 148 and provided with peripheral groove 164 on its outer periphery, is provided at its opposite ends with oppositely facing axially extending teeth 166 and 168 which have inclined end faces 167 and 169 respectively of the Maybach type heretofore described. Arcuate actuating yoke 170 is received in a sliding free running fit in peripheral groove 164 and is provided at diametrically disposed points with pivots 172 providing a pivotal connection to a fork 174 best illustrated in Figure 4.

Clutch fork 174 comprises a pair of metal strip members 176 and 178 bent to have mating portions 180 and 182 which are fixed together as by a rivet 184. Members 176 and 178 diverge from portions 180 and 182 to form a fork at the opposed ends of which are attached the pivots 172 to provide a pivotal connection to yoke 170 at diametrically opposed points. At intermediate portions 186 and 188, clutch fork members 176 and 178 are fixed to the end flanges 190 of a transverse guide plate 192 by rivets 194. The central portion of plate 192 is apertured at 196 (Figure 3), and the surrounding portion of guide plate 192 is formed to a concave socket as indicated at 198. Concave socket 198 receives the convex face of a washer 200 to form a universal connection. Washer 200 and plate 192 are mounted on a stud 202 which is fixed to housing wall 24. Nut 204 is threaded on the end of guide stud 202 and maintains convex washer 200 in assembled relation with concave socket 198 of plate 192 against the biasing force of compression type coil spring 206 which surrounds stud 202 intermediate socket portion 198 of plate 192 and the centrally disposed integral head 208 of stud 202. Enlarged opening 196 permits pivotal movement of shifter fork 174 relative to stud 202.

With reference to the reverse mounting or back to back mounting of tapered thrust bearings 48, 50, 70 and 72, as shown in Figure 3, this type of mounting permits these bearings to take both forward and reverse thrust loads as well as radial loads as heretofore noted. As a result shaft 30 and pinion shaft 76 are in effect in rigid relative alignment thereby preventing any relative axial or radial movement of these members. As a result of the relatively rigid mounting of shafts 30 and 76, planetary gear carrier 102 is also in effect rigidly mounted. Sun gear 148 is cantilever mounted at one end to radially float at its free end with respect to a relatively rigid axis and seek its own center of rotation at its region of mesh with the planetary pinions 142. Ring gear 88 is also permitted a limited degree of lateral floating on splines 85. The combined effect of the floating of the sun gear 148 and driving gear 88 assures uniform loading of planetary pinions 142 resulting in better wearing qualities and better operating conditions.

The fluid motor 34 for controlling the position of fork 174 is secured to the forward side of boss 32 of housing 22 by mounting plate 210 fixed thereto by a plurality of bolts 36 (Figure 1) heretofore described. Boss 32 is provided with axial bore 212 terminating at its left hand end, as viewed in Figure 3, in enlarged counter-bore 214. The casing 216 of the fluid motor 22 is suitably secured to mounting ring 210, by weld 218, and consists of two halves suitably joined together with a resilient diaphragm 220 clamped between the opposed peripheral flanges thereof to divide the fluid chamber within the housing 216 into two separate fluid tight compartments. A pair of plates 222 and 224 are clamped in opposed contacting relation with opposite sides of the inner annular head 226 of the diaphragm 220 by an externally threaded apertured member 228 and a coacting nut 230. The member 228 is fixed to an axially shiftable tube 232 by a stud bolt 234 threadedly engaging the adjacent end of tube 232 extending through the longitudinal bore of member 228 and secured in assembled relation with member 228 and nut 230 by a further nut 236.

Fixed on the periphery of shaft tube 232 is a stop member 238 which slidably engages an annular seal 240 mounted in neck portion of the right hand half of housing 216 to form a fluid tight seal therebetween. Also axially fixed on shaft tube 232 is a snap ring 237 in an external groove to serve to stop leftward displacement of the tube in Figure 3.

Shaft tube 232 is axially slidable in bore 212 and the limits of its sliding movements are defined in one direction by engagement of stop 237 rigid with tube 232 with the housing 22 at the inner end of bore 212 and in the other direction by the abutting engagement of the right hand end of stop member 238 with the bottom of counterbore 214.

Shiftable tube 232 is provided with internal bore 241 which slidably mounts spaced washers 242 and 244 the axially aligned bores of which slidably receive shift rod 246. Washer 242 is adapted to abut at its inner periphery the head 248 of rod 246 and at its outer periphery internal shoulder 250 of shift tube 232, while washer 244 is adapted to abut internally mounted snap ring 252 at its outer periphery and external shoulder 254 of shift rod connector yoke 256, threadedly secured to the right hand end of shift rod 246. Coil spring 258 coaxially mounted on rod 246 intermediate the washers 242 and 244 serves to bias the washers into contacting engagement with their respective shoulders and snap rings and is compressed and expanded during the shift cycle of clutch collar 162.

Connecting yoke 256 extends externally of shift tube 232 and its arms 260 (see also Figure 4) receive therebetween the end of shift fork 174, and are connected thereto by a pin 262 to transmit the shifting movements of shift rod 246 to the shift fork 174.

An enlarged plug 264 is mounted in housing 22 in general alignment with shift fork 174 to permit access to the connection between yoke 256 and shift fork 174 and between the shift fork and bolt 208, for purposes of assembly and lubrication.

Housing 216 of fluid motor 34 is provided with a pair of internally threaded fluid fittings 266 and 268 opening into the housing 216 on opposite sides of diaphragm 220.

An automatic control 270 (Figure 9) comprises an electric switch 272 located beneath and actuated by the usual pivoted carburetor connected accelerator pedal 274 of a vehicle. Solenoids 276 and 278, the ungrounded ends of the coils of which are suitably connected to the switch by electrical leads 280 and 282, respectively, have their movable cores suitably mechanically connected to opposite ends of selector valve 284 to selectively position the valve for operation. Switch 272 is of such type that successive actuations of the switch will actuate the solenoids alternately to establish alternate connections through the selector valve 284 from fluid outlet conduits 286 or 288, which connect, through fittings 266 and 268, respectively, opposite sides of resilient diaphragm 220 to inlet conduit 290 connected to the engine intake manifold (not shown). Thus selected depressions of switch 272 will properly position the selector valve 284 to connect the engine intake manifold to the desired side of the resilient diaphragm 220 to create a vacuum on that side of the diaphragm and result in a pressure differential between opposite sides of the diaphragm to effect movement of the diaphragm for shifting the clutch collar 162.

With regard to the manner of operation of the novel two-speed planetary transmission there is shown in Figures 10, 10A and 10B, 11, 11A and 11B, and 12, 12A, and 12B, the three conditions or phases of operation. Figures 10, 10A and 10B show the unit in the direct drive high-speed condition while Figures 3, 12, 12A and 12B show the unit in its low-speed or underdrive condition. Figures 11, 11A and 11B illustrate a transition position that exists during the shifting of clutch collar 162 between direct drive and underdrive. The intermediate position of clutch collar 162 illustrated by Figures 11, 11A and 11B is not a neutral position but is merely a momentary transition position in the movement of clutch 162 from driving engagement with one of the toothed rings 128 and 152 to driving engagement with the other.

For ease of explanation, the operation of the gearing in direct and low or underdrive conditions will be first explained and later the operation of the means for actuating the clutch mechanism to attain these driving conditions will be explained.

Referring to Figures 10, 10A and 10B, there is shown the direct drive position of the transmission. The teeth 166 of clutch collar 162 are engaged with teeth 150 of clutch ring 128. Since ring gear 88, planet pinions 142 and sun gear 148 are constantly in mesh, with clutch collar 162 in this position there is a rigid connection between ring gear 88 and sun gear 148 so that rotation of shaft 30 will unitarily rotate ring gear 88, planet pinions 142, sun gear 148 and clutch collar 128 about the axis of shaft 76 and planet pinions 142 will not be able to rotate on spindles 122.

When clutch collar 162 is shifted so that its teeth 168 are in engagement with teeth 154 of brake ring 152, as illustrated in Figures 3, 12, 12A and 12B, there is created an underdrive, or speed reduction, between shaft 30 and pinion shaft 76. Sun gear 148 is held against rotation relative to housing 22 by virtue of the rigid connection between sun gear 148, clutch collar 162 and ring 152 rotationally fixed to rear housing wall 24. Under these conditions, rotation of shaft 30 will cause ring gear 88 to rotate planet pinions 142 on their own spindles 122 as they move about sun gear 148. The movement of planet pinions 142 about sun gear 148 is imparted to carrier 102 and to pinion shaft 76.

Referring now to Figure 9, the actuating and control means for shifting the transmission from the direct drive condition illustrated in Figures 10, 10A and 10B to underdrive illustrated in Figures 12, 12A and 12B energize solenoid 276 which positions selector valve 284 so that the engine intake manifold is connected through the selector valve and conduit 286 to the left side of diaphragm casing 216 as viewed in Figure 3. A vacuum is created on the left side of the diaphragm and the pressure on the right acts to force diaphragm 220 and shift member 232 together toward the left, until stop 237 abuts the wall of housing 22 at the inner end of bore 212, thereby compressing spring 258.

The operator now removes his foot from the accelerator pedal 274, thereby relieving the driving torque between clutch teeth 150 and 166, and spring 258 now expands effecting leftward movement of rod 246 and clockwise rotation of shift fork 174 to move clutch collar 162 to the right as viewed in Figure 3 to disengage teeth 150 and 166. The mechanism is then in the transition stage of Figures 11, 11A and 11B. During this shifting, clockwise rotation of shift fork 174 under the influence of the leftward movement of rod 246 also causes concave portion 198 to pivot about convex surface of washer 200, maintained in bearing contact by spring 206.

As clutch collar 162 passes from the direct drive condition of Figures 10, 10A and 10B to the transition stage of Figures 11, 11A and 11B, the collar 162 is rotating relative to stationary ring 152. It is therefore necessary to relatively stop rotation of clutch collar 162 in order to have smooth engagement of teeth 168 and 154. In order to bring clutch collar 162 to a relative stop, the operator again depresses accelerator pedal 274 which causes the engine to speed up. The speeding up of the engine will cause shaft 30 and ring gear 88 to speed up faster than carrier 102 and shaft 76. Planetary pinions 142 will cause sun gear 148 and collar 162 to slow down relative to ring gear 88 and shaft 30. Under the influence of spring 258, shift rod 246 moves to the left to pivot shift fork 174 in a clockwise direction to bias collar 162 toward ring 152 to effect smooth intermeshing between teeth 168 and 154 as soon as there is no relative rotation between clutch collar 162 and ring 152.

In the transition stage where clutch collar 162 is in toothed engagement with neither clutch ring 128 nor brake ring 152 as illustrated in Figures 11, 11A and 11B, there is a ratcheting of teeth 150 relative to teeth 166 and of teeth 168 relative to teeth 154 since the longitudinal distance between two parallel planes containing the axially outermost points of clutch teeth 166 and 168 on collar 162 is slightly greater than the corresponding distance between the high points of teeth 150 and 154 in Figure 11 position. This ratcheting action is permitted by the axial slidable mounting of brake ring 152 against the resilient force of springs 156. The ratcheting of collar 162 relative to rings 128 and 152 is more fully described in co-pending application Serial No. 330,441 to which reference is made for a more detailed description.

The force of spring 258 acting through shift fork 174 and collar 162 is not sufficient to move brake ring 152 to the right against the resilient force of collective springs 156 during a shift to underdrive. Collar 162 during such a shift is moved by spring 258 to the right enough for the short sides of teeth 166 to clear the short sides of teeth 150 before making any contact with rotationally fixed ring 152. Collar 162 is forced further to the right by the ratchet action of teeth 166 riding over teeth 150 as described above. This ratchet action and the concurrent ratchet action of collar teeth 168 riding over teeth 154 forces brake ring 152 to the right against the resilient force of springs 156. This displacement of brake ring 152 during the transition state in a shift to either direct or underdrive insures swift engagement in the desired drive from the transition stage at the moment teeth to be meshed are synchronous and in alignment. Brake ring 152 quickly returns to the position illustrated by Figure 3 snapping teeth 154 into full engagement with teeth 168 for underdrive upon synchronism and alignment thereof. Brake ring 152 is quickly returned to the left position illustrated by Figure 3 when collar teeth 166 have become synchronized and aligned with teeth 150 during a shift to direct drive. This gives clutch collar 162 a quick impetus to the left for full engagement of collar teeth 166 with clutch ring teeth 150 which is further insured by the biasing force of spring 258 through shift fork 174 and collar 162.

In shifting from the underdrive condition illustrated in Figures 3, 12, 12A and 12B to the direct drive condition of Figures 10, 10A and 10B, the operator again preselects the desired drive condition by actuating switch 272 with accelerator pedal 274 which energizes solenoid 278 and positions selector valve 284 so that the engine intake manifold creates a vacuum on the right side of diaphragm 220. The resultant pressure differential forces diaphragm 220 and shift tube 232 together to the right. This movement causes shift tube 232 to abut washer 242 and move washer 242 to the right again compressing spring 258. The sliding movement of tube 232 continues until the righthand end of stop member 238 abuts the bottom of counterbore 24. During the axial movement of tube 232, rod 246 and consequently shift fork 174 are motionless due to the driving engagement between teeth 168 and 154.

Once stop member 238 abuts the bottom of counterbore 214, the operator releases the accelerator to relieve the driving torque engagement between teeth 168 and 154 to permit spring 258 to expand and shift collar 162 to and through the transition stage illustrated in Figures 11, 11A and 11B.

In this instance, when shifting to direct drive illustrated in Figures 10, 10A and 10B the accelerator pedal 274 is not again depressed except to maintain desired vehicle speed.

If after selecting direct drive and letting up on the accelerator the operator should again depress the accelerator before clutch teeth 150 and 166 have engaged, the transmission will automatically slip back from the transition stage of Figures 11, 11A and 11B toward the underdrive position of Figures 3, 12, 12A and 2B with partial engagement of the high points of teeth 168 with the high points of teeth 154. If the accelerator is depressed sufficiently to actuate switch 272, the selector valve 284 will be repositioned to create a vacuum on the left side of diaphragm 220 to move collar 162 fully to the underdrive condition. Once teeth 150 and 166 become fully engaged in direct drive, however, acceleration of the vehicle will not permit slippage back to underdrive due to the torque transmitting engagement between the engaged teeth and the fact that there is then no ratcheting of the clutch collar and ring teeth.

From the foregoing it will be seen that there is herein disclosed a simple and novel two speed planetary transmission which is compact, rigid, and so, by virtue of novel details of construction inexpensively manufactured and readily and easily placed in any type of drive of the conventionally known vehicles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by United States Letters Patent is:

1. In combination in a drive axle assembly wherein an axle housing has an opening and a differential carrier has a housing portion mounted over said opening and a differential mechanism carrier projecting into said axle housing, an auxiliary transmission housing secured upon said carrier housing portion with said transmission housing and said carrier housing portion being provided with aligned openings, a bearing cage mounted in said carrier housing portion opening, said bearing cage having a flange extending between the carrier housing portion and said transmission housing, a pinion shaft for driving said differential mechanism journalled in said cage and projecting into said transmission housing, an input shaft journalled in said housing coaxially with said pinion shaft, an internal ring gear on said input shaft within said transmission housing, a planet gear support non-rotatably mounted on said pinion shaft, a plurality of rotatable planetary gears mounted on said support constantly meshed with said ring gear, a sun gear rotatably mounted on said support and constantly meshed with said planetary gears, a first toothed ring fixed on said planetary gear support, a second toothed ring non-rotatably mounted on said transmission housing, said transmission housing having a plurality of wall apertures at the back of said second toothed ring, compression springs in said apertures reacting between said second toothed ring and said bearing cage flange, and a toothed coupling collar non-rotatably slidably mounted on said sun gear into mesh with one or the other of said toothed rings.

2. In the combination defined in claim 1, said shafts both being journalled on spaced opposed tapered roller bearings.

3. In a two speed transmission having no neutral condition, two axially spaced relatively rotatably toothed rings each associated with a different speed ratio mechanism in said transmission and each having a coaxial row of teeth extending toward the other, a relatively rotatable coupling collar disposed between said rings and having on opposite sides coaxial rows of teeth extending toward the adjacent rings, means mounting said collar for axial shift between one selective speed ratio position where said collar has the teeth on one side meshed in torque transmitting engagement with the teeth of the adjacent ring and a second selective speed ratio position where said collar has the teeth on its other side mashed in torque transmitting engagement with the teeth of the adjacent ring, means for shifting said collar in opposite directions toward one or the other of said positions, said teeth on the said rings and collar all having axially directed faces which are inclined at an acute angle and in the same direction with respect to the axis of said rings, and the distance measured parallel to said axis between the high points of said tooth faces on opposite sides of said collar being sufficiently greater than the corresponding distance between the high points of the tooth faces of said rings in their relative normal spaced positions that the teeth on both sides of said collar ratchet over the respective ring teeth during transition of said collar between conditions of torque transmitting mesh with one or the other of said rings, a plurality of circumferentially spaced axially projecting members slidably mounting one of said rings for limited axial displacement from a normal position corresponding to said position that it occupies in its selective speed ratio position, and resilient means backing said one ring for permitting such displacement and constantly urging return of said one ring to said normal position comprising a plurality of compression springs located in the spaces circumferentially between said members.

4. In the combination defined in claim 3, said housing having a plurality of fixed sockets disposed circumferentially between said members and said compression springs being coil springs in said sockets bearing against the side of said one ring opposite the toothed side thereof.

5. In a two speed transmission having no neutral condition, a housing, an input shaft and an output shaft coaxially journalled on said housing, a ring gear on the input shaft, a planet gear carrier non-rotatably mounted on the output shaft, a sun gear journalled on said carrier, a plurality of planetary gears rotatably mounted on said carrier and constantly meshed with said ring gear and said sun gear, two axially spaced toothed rings non-rotatably mounted respectively on said carrier and said housing and each having a coaxial row of coupling teeth extending toward the other, a coupling collar disposed between said rings slidably and non-rotatably mounted on said sun gear and having on opposite sides coaxial rows of teeth extending toward the adjacent toothed ring, means for axially shifting said collar between one selective speed ratio position where said collar has the teeth on one side meshed in torque transmitting engagement with the teeth of the carrier mounted ring and a second selective speed ratio position where said collar has the teeth on its other side meshed in torque transmitting engagement with the teeth of the housing mounted ring, said teeth on the said ring and collar all having axially directed faces which are inclined at an acute angle and in the same direction with respect to the axis of said rings, and the distance measured parallel to said axis between the high points of said tooth faces on opposite sides of said collar being sufficiently greater than the corresponding distance between the high points of the tooth faces of the rings in their relative normal spaced positions that the teeth on both sides of said collar ratchet over the respective ring teeth during transition of said collar between conditions of torque transmitting mesh with one or the other of said rings, a plurality of circumferentially spaced members axially projecting from said housing for slidably mounting said housing mounted ring for limited axial displacement from a normal position corresponding to said position that it occupies in its selective speed ratio position, and resilient means backing said housing mounted ring for permitting such displacement and constantly urging return of said housing mounted ring to said normal position comprising a plurality of compression springs located in the spaces circumferentially between said members.

6. In a two speed transmission having no neutral condition, a housing, coaxial shaft journalled on said housing, one shaft having a ring gear on its inner end, a planet carrier non-rotatably mounted on the other shaft, a sun gear rotatably mounted on said carrier, a plurality of planetary gears rotatably mounted on said carrier and constantly meshed with said sun and ring gears, two axially spaced toothed rings non-rotatably mounted respectively on said carrier and said housing and each having a coaxial row of teeth extending toward the other, a collar disposed between said rings non-rotatably and slidably mounted on said sun gear and having on opposite sides coaxial rows of teeth extending toward the adjacent toothed ring, means for axially shifting said collar between one selective speed ratio position where said collar has the teeth on one side meshed in torque transmitting engagement with the teeth of the adjacent toothed ring and a second selective speed ratio position where said collar has the teeth on its other side meshed in torque transmitting engagement with the teeth of the adjacent toothed ring, said teeth on the said rings and collar all having axially directed faces which are inclined at an acute angle and in the same direction with respect to the axis of said rings, and the distance measured parallel to said axis between the high points of said tooth faces on opposite sides of said collar being sufficiently greater than the corresponding distance between the high points of the tooth faces of the rings in their relative normal spaced positions that the teeth on both sides of said collar ratchet over the respective ring teeth during transition of said collar between conditions of torque transmitting mesh with one or the other of said rings, means mounting said housing mounted ring for limited axial displacement from a normal position corresponding to said position that it occupies in its selective speed ratio position comprising a plurality of axially projecting housing bolts upon which said housing mounted ring is slidably supported, and resilient means backing said housing mounted ring for permitting such displacement and constantly urging return of said housing mounted ring to said normal position comprising a plurality of sockets in the spaces circumferentially between said bolts and compression springs in said sockets engaging the housing mounted ring on the side opposite its said row of teeth.

References Cited in the file of this patent

UNITED STATES PATENTS

| | | |
|---|---|---|
| 1,225,360 | Royce | May 8, 1917 |
| 1,298,401 | Ricardo | Mar. 25, 1919 |
| 1,703,650 | Whitacre et al. | Feb. 26, 1929 |
| 2,312,263 | Ormsby | Feb. 23, 1943 |
| 2,336,513 | Taylor | Dec. 14, 1943 |
| 2,399,657 | Banker | May 7, 1946 |
| 2,644,550 | Flinn | July 7, 1953 |
| 2,655,042 | Almond | Oct. 13, 1953 |